United States Patent
Lee et al.

(10) Patent No.: US 7,436,764 B2
(45) Date of Patent: Oct. 14, 2008

(54) NOTIFICATION OF CONTROL INFORMATION IN WIRELESS COMMUNICATION SYSTEM

(75) Inventors: Young Dae Lee, Kyoungki-do (KR); Sung Duck Chun, Anyang (KR); Seung June Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 379 days.

(21) Appl. No.: 11/150,317

(22) Filed: Jun. 10, 2005

(65) Prior Publication Data

US 2005/0286483 A1 Dec. 29, 2005

(30) Foreign Application Priority Data

Jun. 16, 2004 (KR) ...................... 10-2004-0044711

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04J 15/00 | (2006.01) |
| H04L 1/00 | (2006.01) |
| H04L 12/26 | (2006.01) |
| H04L 12/40 | (2006.01) |
| H04H 20/71 | (2008.01) |
| H04Q 7/20 | (2006.01) |
| H04B 7/00 | (2006.01) |

(52) U.S. Cl. ...................... 370/229; 370/312; 370/438; 455/434; 455/515

(58) Field of Classification Search .............. 370/277, 370/229, 310, 312, 438; 455/434, 511, 515, 455/68, 70

See application file for complete search history.

(56) References Cited

U.S. PATENT DOCUMENTS 5,819,173 A * 10/1998 Lawrence et al. ........... 455/515
6,097,928 A * 8/2000 Jeon ............................ 455/8

(Continued)

FOREIGN PATENT DOCUMENTS

EP 1377099 A1 1/2004

OTHER PUBLICATIONS

3GPP; "Tcckuiical Specification Group Radio Accsss Nchuork; Introduction of the Multimedia Broadcast Multicast Service. (MBMS) in the Radio Access Network (RAN); Stage 2(Release 6 )"; 3GPP TS 25.346 V6.0.0; Mar. 2004.

(Continued)

Primary Examiner—Andrew Wendell
(74) Attorney, Agent, or Firm—Lee, Hong, Degerman, Kang & Schmadeka (57) ABSTRACT

The present invention relates to notifying updated control information of a point-to-multipoint service in a wireless communications system. An indication about whether control channel information has been updated is transmitted and received during a time interval where data of the point-to multipoint service is not transmitted between a network and a mobile terminal. Furthermore, and indication about whether the control channel information has been updated is transmitted and received via a physical channel, to which a traffic channel is mapped. This allows the mobile terminal, which receives data of a specific point-to-multipoint service discontinuously, to effectively recognize whether the control channel information has been updated.

33 Claims, 6 Drawing Sheets

U.S. PATENT DOCUMENTS

| | | | | |
|---|---|---|---|---|
| 6,108,542 | A * | 8/2000 | Swanchara et al. | 455/434 |
| 6,185,422 | B1 * | 2/2001 | Mattila | 455/434 |
| 6,385,196 | B1 * | 5/2002 | Hayball et al. | 370/356 |
| 6,483,824 | B1 * | 11/2002 | Ault | 370/332 |
| 6,493,552 | B1 * | 12/2002 | Hicks | 455/435.2 |
| 6,600,758 | B1 * | 7/2003 | Mazur et al. | 370/508 |
| 7,180,885 | B2 * | 2/2007 | Terry | 370/338 |
| 2002/0032030 | A1 * | 3/2002 | Berglund et al. | 455/434 |
| 2004/0223513 | A1 * | 11/2004 | Meago | 370/468 |
| 2005/0070320 | A1 * | 3/2005 | Dent | 455/516 |
| 2005/0159164 | A1 * | 7/2005 | Leedom, Jr. | 455/450 |
| 2005/0195852 | A1 * | 9/2005 | Vayanos et al. | 370/437 |
| 2008/0070611 | A1 * | 3/2008 | Yi et al. | 455/515 |

OTHER PUBLICATIONS

Motorola; "In-Band Secondary Notification Indicator for the MCCH"; 3GPP TSG RAN WG2 MBMS ad hoc Tdoc R2-040811; [online] Apr. 22, 2004, [retrieved on Aug. 18, 2005]. Retrieved from the Internet: <URL:ftp.3gpp.org/tsg-ran/WG_RL2/TSGR2_AHs/2004_04_MBMS/RS-040811.zip>.

* cited by examiner

NOTIFICATION OF CONTROL INFORMATION IN WIRELESS COMMUNICATION SYSTEM

CROSS-REFERENCE TO RELATED APPLICATIONS

Pursuant to 35 U.S.C. § 119(a), this application claims the benefit of earlier filing date and right of priority to Korean Application No. 2004-0044711, filed on Jun. 16, 2004, the contents of which is hereby incorporated by reference herein in its entirety.

FIELD OF THE INVENTION

The present invention relates to transmitting and receiving a point-to-multipoint service in a wireless communication system, and more particularly, to notifying updated control information of the point-to-multipoint service to a mobile terminal.

BACKGROUND OF THE INVENTION

A universal mobile telecommunications system (UMTS) is a third-generation mobile communications system evolving from a global system for mobile communications system (GSM), which is the European standard. The UMTS is aimed at providing enhanced mobile communications services based on the GSM core network and wideband code-division multiple-access (W-CDMA) technologies.

In December 1998, ETSI of Europe, ARIB/TTC of Japan, T1 of the United States, and TTA of Korea formed a Third Generation Partnership Project (3GPP) for creating detailed specifications of the UMTS technology. Within the 3GPP, in order to achieve rapid and efficient technical development of the UMTS, five technical specification groups (TSG) have been created for determining the specification of the UMTS by considering the independent nature of the network elements and their operations.

Each TSG develops, approves, and manages the specification within a related region. Among these groups, the radio access network (RAN) group (TSG-RAN) develops the specifications for the functions, requirements, and interface of the UMTS terrestrial radio access network (UTRAN), which is a new radio access network for supporting W-CDMA access technology in the UMTS.

Figure 1:
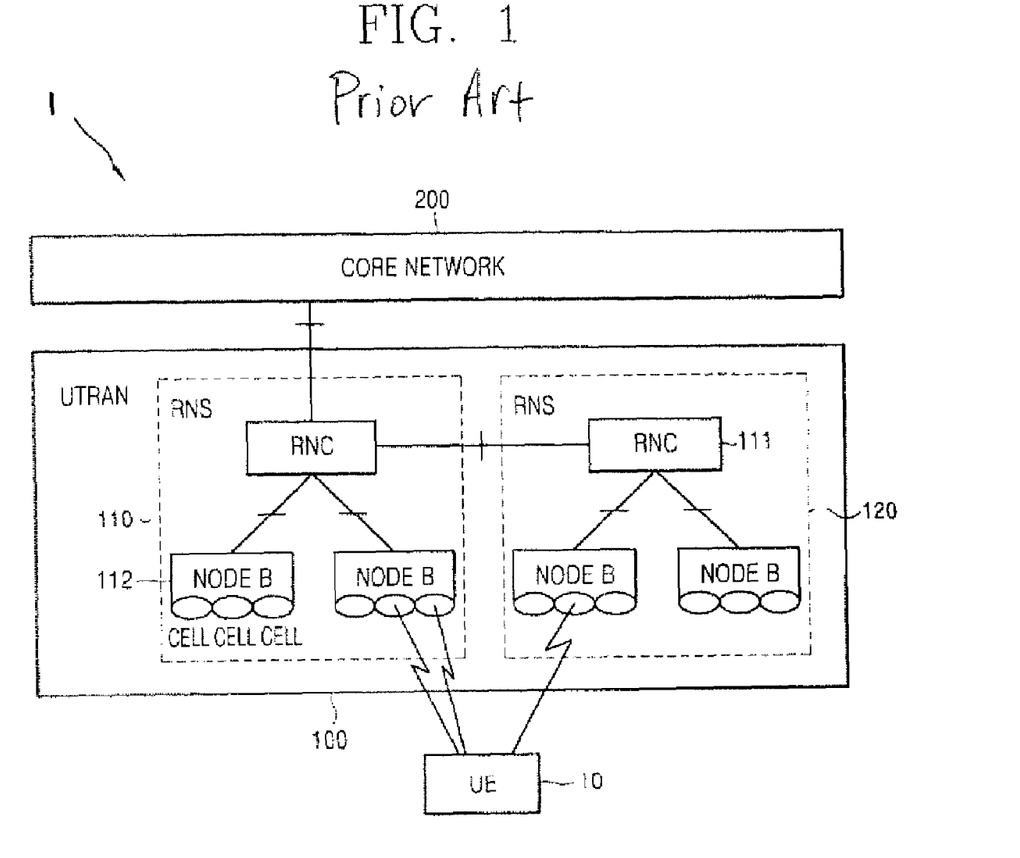
FIG. 1 illustrates a general UMTS network structure.

A related art UMTS network structure 1 is illustrated in FIG. 1. As shown, a mobile terminal, or user equipment (UE) 10 is connected to a core network (CN) 200 through a UMTS terrestrial radio access network (UTRAN) 100. The UTRAN 100 configures, maintains and manages a radio access bearer for communications between the UE 10 and the core network 200 to meet end-to-end quality of service requirements.

The UTRAN 100 includes a plurality of radio network subsystems (RNS) 110, 120, each of which comprises one radio network controller (RNC) 111 for a plurality base stations, or Node Bs 112. The RNC 111 connected to a given base station 112 is the controlling RNC for allocating and managing the common resources provided for any number of UEs 10 operating in one cell. One or more cells exist in one Node B. The controlling RNC 111 controls traffic load, cell congestion, and the acceptance of new radio links. Each Node B 112 may receive an uplink signal from a UE 10 and may transmit downlink signals to the UE 10. Each Node B 112 serves as an access point enabling a UE 10 to connect to the UTRAN 100, while an RNC 111 serves as an access point for connecting the corresponding Node Bs to the core network 200.

Among the radio network subsystems 110, 120 of the UTRAN 100, the serving RNC 111 is the RNC managing dedicated radio resources for the provision of services to a specific UE 10 and is the access point to the core network 200 for data transfer to the specific UE. All other RNCs 111 connected to the UE 10 are drift RNCs, such that there is only one serving RNC connecting the UE to the core network 200 via the UTRAN 100. The drift RNCs 111 facilitate the routing of user data and allocate codes as common resources.

The interface between the UE 10 and the UTRAN 100 is realized through a radio interface protocol established in accordance with radio access network specifications describing a physical layer (L1), a data link layer (L2) and a network layer (L3) described in, for example, 3GPP specifications. These layers are based on the lower three layers of an open system interconnection (OSI) model that is well known in communications systems.

Figure 2:
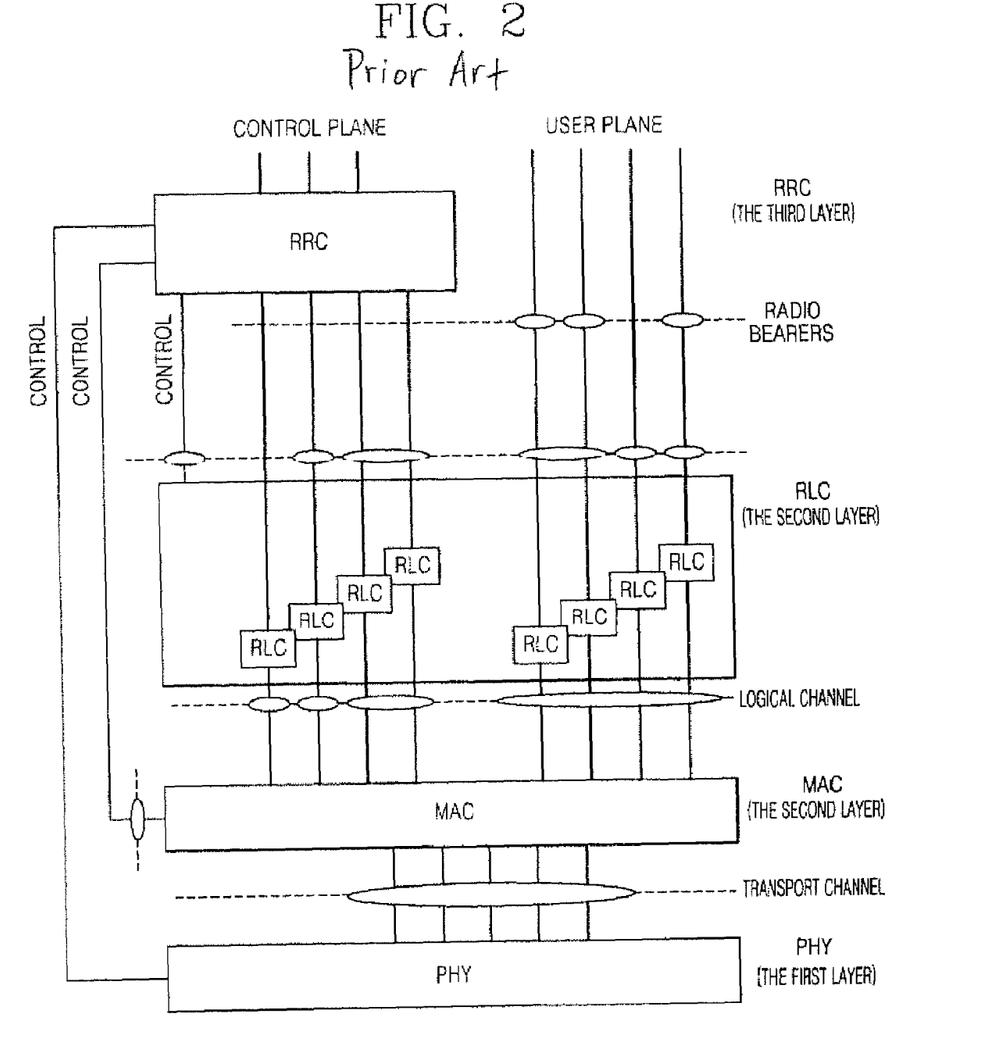
FIG. 2 illustrates a related art radio interface protocol architecture.

A related art architecture of the radio interface protocol is illustrated in FIG. 2. As shown, the radio interface protocol is divided horizontally into a physical layer, a data link layer, and a network layer, and is divided vertically into a user plane for carrying data traffic such as voice signals and Internet protocol packet transmissions, and a control plane for carrying control information for the maintenance and management of the interface.

The physical layer (PHY) provides information transfer service to a higher layer and is linked via transport channels to a medium access control (MAC) layer. Data travels between the MAC layer and the physical layer via a transport channel. The transport channel is divided into a dedicated transport channel and a common transport channel depending on whether a channel is shared. Also, data transmission is performed through a physical channel between different physical layers, namely, between physical layers of a sending side (transmitter) and a receiving side (receiver).

The MAC layer of the second layer provides a service to an upper layer, namely, an RLC (Radio Link Control) layer, via a logical channel. The RLC layer supports reliable data transmissions, and performs a segmentation and concatenation function on a plurality of RLC service data units (RLC SDUs) delivered from an upper layer.

A radio resource control (RRC) layer located in a lowermost portion of the L3 layer is defined only in the control plane. The RRC manages the control of logical channels, transport channels, and physical channels with respect to establishment, reconfiguration and release of radio bearers (RBs). A radio bearer service refers to a service that the second layer (L2) provides for data transmission between the terminal and the UTRAN. In general, the establishment of a radio bearer refers to defining the protocol layers and the channel characteristics of the channels required for providing a specific service, as well as respectively setting substantial parameters and operation methods.

A Multimedia Broadcast Multicast Service (MBMS) is implemented in the UMTS system as follows. The MBMS refers to a method for providing a streaming or background service to one or more terminals by using a downlink-exclusive MBMS bearer service. One MBMS service is made up of one or more sessions, and MBMS data is transmitted to multiple terminals through the MBMS bearer service only when a session is ongoing.

The UTRAN 100 provides the MBMS bearer service to terminals using an RB. Two types of RBs used by the UTRAN 100 are a point-to-point RB and a point-to-multipoint RB. The point-to-point RB is a bidirectional RB, including a logical channel DTCH (Dedicated Traffic Channel), a transport channel DCH (Dedicated Channel) and a physical channel DPCH (Dedicated Physical Channel) or a physical channel SCCPCH (Secondary Common Control Physical Channel).

Figure 3:
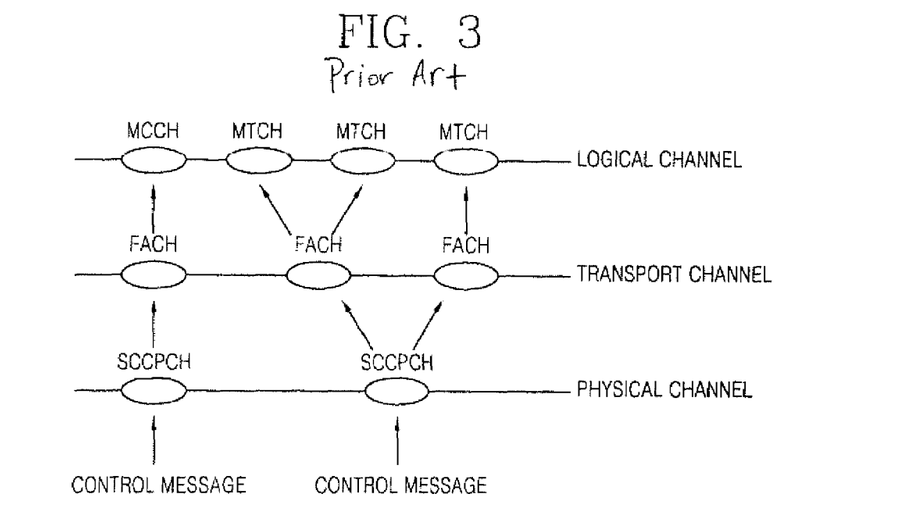
FIG. 3 illustrates related art channel mapping at a terminal with respect to a point-to-multipoint service.

The point-to-multipoint RB is a unidirectional downlink RB, including a logical channel MTCH (MBMS Traffic Channel), a transport channel FACH (Forward Access Channel) and the physical channel SCCPCH as shown in FIG. 3. The MTCH is configured for every MBMS service provided in one cell and used to transmit user plane data of a specific MBMS service to multiple terminals.

FIG. 3 illustrates a channel mapping structure of the point-to-multipoint RB. A logical channel MCCH, which is a point-to-multipoint downlink channel, transmits MBMS-related control information. The MCCH is mapped to the transport channel FACH. The FACH is mapped to the physical channel SCCPCH. Only one MCCH exists in one cell.

The UTRAN providing the MBMS transmits MCCH information to multiple terminals via the MCCH. The MCCH information includes a notification message related to the MBMS. Namely, the notification message is an RRC message related to the MBMS. For example, the MCCH information includes a message having MBMS service information, a message having point-to-multipoint RB information and access information indicating that RRC connection is requested for a specific MBMS.

Figure 4:
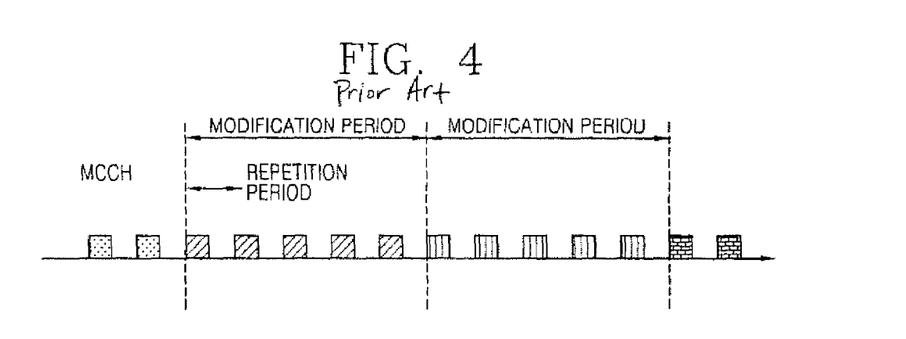
FIG. 4 is a conceptual view illustrating a related art method for transmitting control channel information.

FIG. 4 is a conceptual view illustrating a transmission method of the MCCH information. The MCCH information is periodically transmitted according to a modification period and a repetition period. The MCCH information may be divided into important information and non-important information. The non-important information may be freely changed and transmitted during every modification period and repetition period. The important information may be changed and transmitted only during the modification period. Specifically, the non-important information may repeatedly be transmitted once every repetition period, and modified important information may be transmitted only at a start point of the modification period.

The UTRAN periodically transmits a physical channel MICH (MBMS notification Indicator Channel) to inform whether the MCCH information is updated during the modification period. Thus, when the terminal wants to receive one specific service, it periodically receives the MICH (not the MCCH or the MTCH) before a session of the corresponding service starts. Updating of the MCCH information is related to the generation, addition, change and removal of a specific item of the MCCH information.

When the session of the specific MBMS service starts, the UTRAN transmits an NI (Notification Indicator), namely, an indicator for notifying the terminal wanting to receive the MBMS service that it should receive the MCCH, via the MICH. Upon receiving the NI via the MICH, the terminal receives the MCCH during a specific modification period indicated by the MICH.

The terminal wanting to receive the specific MBMS using the point-to-multipoint RB, receives the MCCH information including the RB information via the MCCH, and establishes the point-to-multipoint RB using the MCCH information. After establishing the point-to-multipoint RB, the terminal continuously receives the physical channel SCCPCH, to which the MTCH is mapped, to obtain data of the specific MBMS transmitted via the MTCH.

Figure 5:
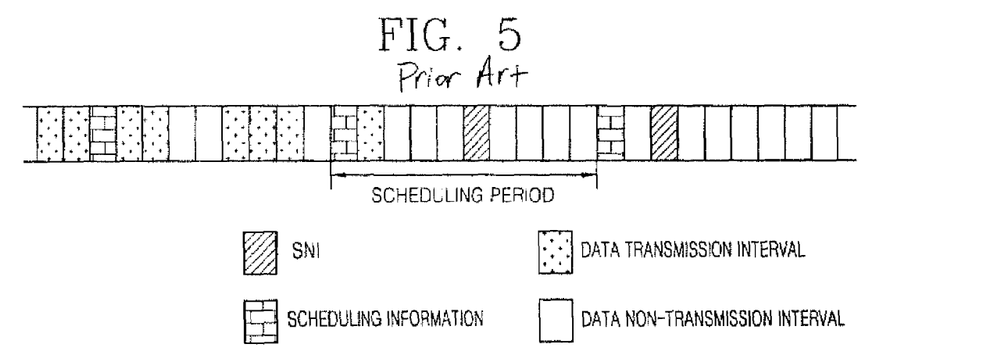
FIG. 5 illustrates service data being transmitted via a physical channel to which a traffic channel is mapped.

FIG. 5 illustrates MBMS service data transmitted via the physical channel SCCPCH to which the MTCH is mapped. The UTRAN discontinuously transmits MBMS data via the MTCH, and periodically transmits the scheduling information via the SCCPCH to which the MTCH is mapped. The scheduling information indicates a transmission interval of the MBMS data, which is transmitted during one scheduling period. Thus, the UTRAN indicates in advance not only the scheduling information but also the transmission period of the scheduling information.

The terminal obtains the transmission period of the scheduling information from the UTRAN, receives scheduling information according to the transmission period of the scheduling information, and discontinuously receives the SCCPCH (to which MTCH is mapped) by using the received scheduling information. Namely, the terminal receives the SCCPCH (to which MTCH is mapped) during a time interval that the MBMS data is transmitted and does not receive the SCCPCH (to which MTCH is mapped) during a time interval that the MBMS data is not transmitted.

The method of determining whether to receive the channel transmitting the MBMS data according to the scheduling information has an advantage that the terminal can effectively receive data. Thus, battery consumption of the terminal can be reduced.

Meanwhile, as shown in FIG. 5, while the MTCH with respect to the specific MBMS is set, the UTRAN transmits an SNI (Secondary Notification Indicator) to the terminal via the SCCPCH (to which MTCH is mapped). When the MCCH information with respect to the specific MBMS is updated, the SNI is used to inform the terminal, which is receiving the MTCH, about whether to update the MCCH information. Accordingly, when the terminal, which is receiving the SCCPCH (to which MTCH is mapped), receives the SNI via the corresponding SCCPCH, the terminal receives the MCCH according to an indication of the SNI, and then receives MCCH information via the MCCH. The SNI can be transmitted or received via the logical channel MTCH or via a different logical channel mapped to the SCCPCH together with the logical channel MTCH.

In the related art MCCH information update notification method, if the MCCH information with respect to the specific MBMS service is to be transmitted through the MCCH, and an MBMS session does not proceed, such as before the session starts or after the session stops, the UTRAN transmits the NI to the terminal via the MICH. If the MCCH information is updated and the MBMS session proceeds, the UTRAN transmits the SNI via the SCCPCH, to which MTCH is mapped.

In order to check whether the MCCH information has been updated, the terminal whose MTCH has not been set receives the NI of the MICH to check whether the MCCH information has been updated. In case that the MTCH of the terminal has been set, the terminal receives the SNI via the SCCPCH, to which MTCH is mapped, and checks whether the MCCH information has been updated.

In the related art control information update notification method, while the MTCH is set, the terminal checks whether the MCCH information with respect to the specific MBMS has been updated by receiving the SNI. However, if the terminal discontinuously receives the MTCH according to the scheduling information, the SNI cannot be received if MBMS data is not being transmitted during discontinuous transmission. Accordingly, a problem occurs because the terminal ineffectively receives the SCCPCH, to which the MTCH is mapped. Consequently, the terminal cannot effectively use its battery. Therefore, what is needed is a control information update notification method wherein the terminal can check whether the MCCH information with respect to the specific MBMS has been updated even during a time interval when the MBMS service data is not being transmitted.

SUMMARY OF THE INVENTION

The present invention is directed to an apparatus and method for notifying updated control information to a mobile terminal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a mobile terminal for receiving a point-to-multipoint service in a wireless communication system, the mobile terminal comprising means for discontinuously receiving a first channel for receiving the point-to-multipoint service, means for receiving a first notification information for receiving a control information message during an ongoing session of the point-to-multipoint service when the mobile terminal receives the first channel, means for receiving a second channel for receiving a second notification information when the mobile terminal does not receive the first channel while maintaining the ongoing session of the point-to-multipoint service, means for determining to receive a control channel for receiving the control information message according to the second notification information, and means for receiving the control information message if the mobile terminal determines to receive the control channel.

Preferably, the mobile terminal further comprises means for configuring the first channel for receiving the point-to-multipoint service during an ongoing session of the point-to-multipoint service, wherein when the mobile terminal does not receive the first channel during the ongoing session, the mobile terminal maintains the configuration of the first channel.

In one aspect of the present invention, the means for determining to receive the control channel comprises means for determining whether the second notification information indicates that a mobile terminal subscribing to the point-to-multipoint service should receive the control information message. Furthermore, the second notification information is periodically received during a time interval when the first channel is not received. Also, the control information message is periodically received.

Preferably, the mobile terminal further comprises means for suspending reception of the first channel according to scheduling information received by the mobile terminal, wherein the scheduling information indicates a time interval for suspending reception of the first channel. Preferably, the mobile terminal further comprises means for resuming reception of the first channel when the time interval for suspending reception has ended. Also, the mobile terminal further comprises means for resuming reception of the first channel after the control information message is received.

In another aspect of the present invention, the first channel is an MTCH. The second channel is an MICH. The first notification information is an SNI. The second notification information is an NI. The control channel is an MCCH.

In accordance with another embodiment of the present invention, a method for receiving a point-to-multipoint service in a wireless communication system comprises discontinuously receiving a first channel for receiving the point-to-multipoint service, receiving a first notification information for receiving a control information message during an ongoing session of the point-to-multipoint service when a mobile terminal receives the first channel, receiving a second channel for receiving a second notification information when the mobile terminal does not receive the first channel while maintaining the ongoing session of the point-to-multipoint service, determining to receive a control channel for receiving the control information message according to the second notification information, and receiving the control information message if the mobile terminal determines to receive the control channel.

Preferably, the method further comprises configuring the first channel for receiving the point-to-multipoint service during an ongoing session of the point-to-multipoint service, wherein when the mobile terminal does not receive the first channel during the ongoing session, the mobile terminal maintains the configuration of the first channel.

In one aspect of the present invention, the step of determining to receive the control channel comprises determining whether the second notification information indicates that a mobile terminal subscribing to the point-to-multipoint service should receive the control information message. Furthermore, the second notification information is periodically received during a time interval when the first channel is not received. Also, the control information message is periodically received.

Preferably, the method further comprises suspending reception of the first channel according to scheduling information received by the mobile terminal, wherein the scheduling information indicates a time interval for suspending reception of the first channel. Preferably, the method further comprises resuming reception of the first channel when the time interval for suspending reception has ended. Also, the method further comprises resuming reception of the first channel after the control information message is received.

In another aspect of the present invention, the first channel is an MTCH. The second channel is an MICH. The first notification information is an SNI. The second notification information is an NI. The control channel is an MCCH.

In accordance with another embodiment of the present invention, a method for transmitting a point-to-multipoint service in a wireless communication system comprises discontinuously transmitting a first channel for transmitting the point-to-multipoint service, transmitting a first notification information for transmitting a control information message during an ongoing session of the point-to-multipoint service when a mobile terminal receives the first channel, transmitting a second channel for transmitting a second notification information when the mobile terminal does not receive the first channel while maintaining the ongoing session of the point-to-multipoint service transmitting a control channel for transmitting the control information message according to the second notification information, and transmitting the control information message if the mobile terminal determines to receive the control channel.

Preferably, the mobile terminal configures the first channel for receiving the point-to-multipoint service during an ongoing session of the point-to-multipoint service, wherein when the mobile terminal does not receive the first channel during the ongoing session, the mobile terminal maintains the configuration of the first channel.

In one aspect of the present invention, the mobile terminal determines to receive the control channel by determining whether the second notification information indicates that a mobile terminal subscribing to the point-to-multipoint service should receive the control information message. Furthermore, the second notification information is periodically transmitted during a time interval when the first channel is not transmitted. Also, the control information message is periodically transmitted.

Preferably, the method further comprises suspending transmission of the first channel according to scheduling information transmitted to the mobile terminal, wherein the scheduling information indicates a time interval for suspending transmission of the first channel. Preferably, the method further comprises resuming transmission of the first channel when the time interval for suspending transmission has ended. Also, the method further comprises resuming transmission of the first channel after the control information message is received by the mobile terminal.

In another aspect of the present invention, the first channel is an MTCH. The second channel is an MICH. The first notification information is an SNI. The second notification information is an NI. The control channel is an MCCH.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

The present invention relates to notifying updated control information of a point-to-multipoint service to a mobile terminal in a wireless communication system.

In a method for notifying updated control information in a wireless communication system, while a session of an MBMS is proceeding, and during a specific time interval where data of the MBMS service is not transmitted, an indicator for indicating whether MCCH information has been updated is transmitted and received via an MICH. During a specific time interval where data of the MBMS service is transmitted, an indicator for indicating whether MCCH information has been updated is transmitted and received via an SCCPCH, to which an MTCH is mapped.

In accordance with a preferred embodiment of the present invention, the UTRAN transmits control information of the MBMS to the terminal via the SCCPCH to which the MCCH is mapped. The UTRAN also transmits, via the MICH, an NI for indicating whether the control information has been updated. Further, the UTRAN provides an SNI for indicating whether the control information has been updated and discontinuous data of the MBMS service via the SCCPCH mapped to the MTCH.

If the session of the MBMS is proceeding and updating of the control information occurs during the time interval where data of the MBMS is not transmitted, the UTRAN transmits the NI via the MICH to notify updating of the control information to the terminal. If updating of the control information occurs during the time interval where data of the MBMS is transmitted via the SCCPCH mapped to the MTCH, the UTRAN transmits the SNI via the SCCPCH mapped to the MTCH to notify updating of the control information to the terminal. The NI and the SNI are notification indicators that indicate the updating of the MCCH information.

While the session of the MBMS is proceeding, the terminal, which has established an RB for the MBMS, receives the MICH successively or periodically during the specific interval where data of the MBMS is not received to check whether the NI has been transmitted. During the specific interval where the terminal receives the MBMS data, the terminal checks whether the SNI has been transmitted via the SCCPCH mapped to the MTCH.

Figure 6:
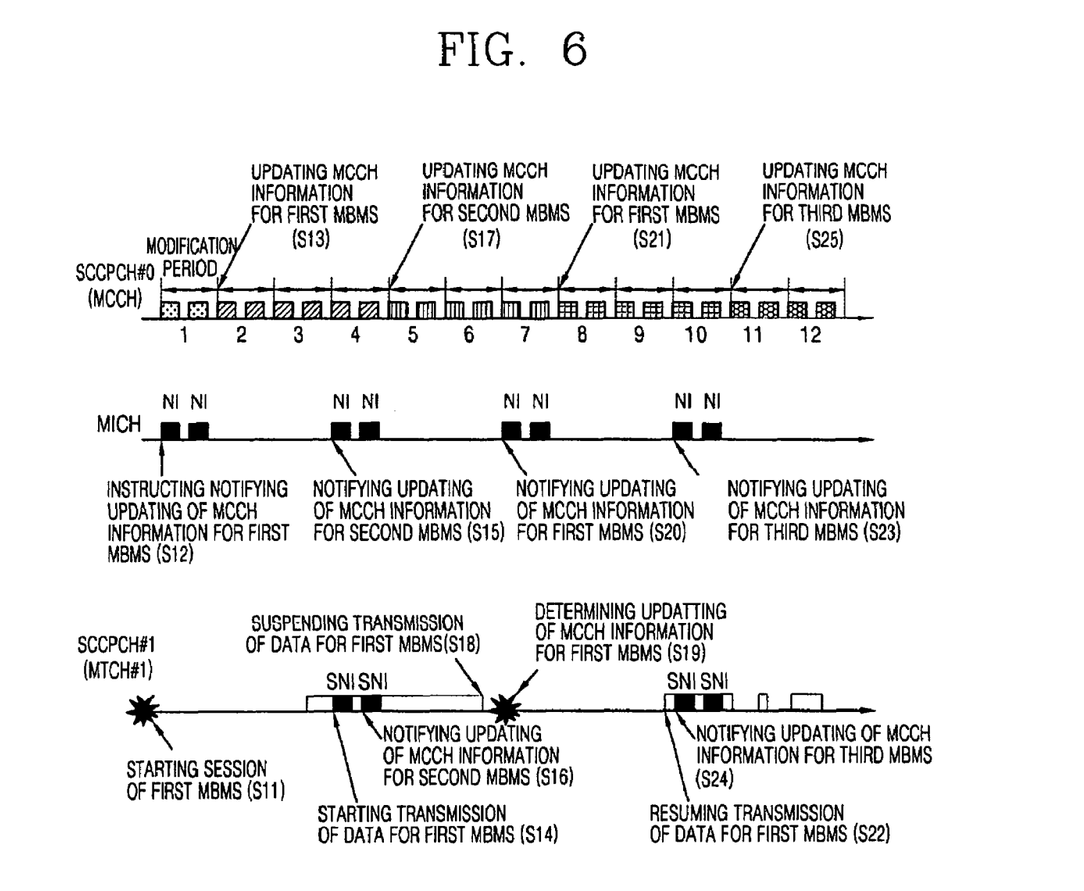
FIG. 6 illustrates a method for notifying updated control information, in accordance with a preferred embodiment of the present invention.

FIG. 6 illustrates a method for notifying updated control information in accordance with a preferred embodiment of the present invention, wherein a method for transmitting MCCH information, NI, MBMS data and an SNI of the UTRAN via an MCCH, an MICH and an MTCH is shown.

Referring to FIG. 6, a first channel is a physical channel SCCPCH#0 to which the logical channel MCCH for transmitting the MCCH information is mapped. A second channel is a physical channel MICH for transmitting the NI. A third channel is a physical channel SCCPCH#1 to which the logical channel MTCH#1 for transmitting the data of the MBMS and the SNI is mapped. The numbers shown for the first channel, as indicated on the time line, are used to discriminate each modification period. A change in form of the MCCH information during the modification period refers to the updating of the MCCH information. In the present invention, a cell provides first, second and third MBMS services, for example.

Preferably, an RNC (Radio Network Controller) of the UTRAN receives a session start message of the first MBMS from a CN (Core Network) and determines to generate MCCH information with respect to the first MBMS (step S11). The RNC also transmits an NI for indicating an update of MCCH information with respect to the first MBMS to the terminal via the MICH (step S12). After, the RNC periodically transmits the MCCH information with information of the first MBMS having RB establishment information added thereto (step S13).

The RNC establishes an RB for the first MBMS and starts transmitting data of the first MBMS via the SCCPCH#1, to which MTCH#1 is mapped (step S14). If the RNC determines to update the MCCH information with respect to the second MBMS, the RNC informs the terminal that the MCCH information with respect to the second MBMS is to be updated through the NI of the MICH (step S15). The RNC then transmits the SNI via the SCCPCH#1, to which MTCH#1 is mapped, in order to inform a different terminal, which is receiving data of the first MBMS, about the update of the MCCH information with respect to the second MBMS (step S16). Preferably, the RNC periodically transmits the MCCH information, which includes information of the updated second MBMS, via the SCCPCH#0, to which the MCCH is mapped (step S17).

The RNC may discontinuously transmit the data of the first MBMS, for which the RNC periodically transmits scheduling information. The scheduling information includes a data transmission interval of the first MBMS via the SCCPCH#1. Accordingly, the RNC temporarily suspends data transmission of the first MBMS according to the scheduling information (step S18).

When the RNC determines to change the MCCH information for the first MBMS (step S19), it transmits the NI that indicates an update of the MCCH information with respect to the first MBMS via the MICH (step S20). Here, because no data is transmitted via the SCCPCH#1 during a seventh modification period for transmitting the NI, the RNC does not transmit the SNI that indicates the update of the MCCH information with respect to the first MBMS.

The RNC changes the MCCH information of the first MBMS and periodically transmits the MCCH information (step S21). The RNC then resumes transmitting the data of the first MBMS according to the scheduling information (step S22). If the RNC determines to update MCCH information with respect to the third MBMS, the RNC informs the terminal about updating the MCCH information with respect to the third MBMS through the NI of the MICH channel (step S23). The RNC then transmits the SNI via the SCCPCH#1, to which MTCH#1 is mapped, to inform the terminal that is receiving the data of the first MBMS about the update of the MCCH information with respect to the second MBMS (step S24).

The RNC periodically transmits the MCCH information including the information of the second MBMS via the SCCPCH#0, to which the MCCH is mapped. The RNC also transmits to a terminal, via the SCCPCH#0, one or more scheduling information data that indicates a discontinuous transmission interval of the first MBMS data (step S25).

Referring to FIG. 6, a method for a terminal to receive MCCH information, an NI, MBMS data and an SNI via an MCCH, an MICH and an MTCH will be explained. First, it is assumed that the terminal has not established any RB with respect to the MBMS, and has been subscribed for the first and second MBMS services but not for the third MBMS service, for example.

Because the terminal has been subscribed for one or more MBMS services but has not established an RB, it periodically wakes up to receive the MICH and checks whether an NI corresponding to the MBMS is inputted (step S11). The terminal then determines whether an NI of a received MICH is related to the first or the second MBMS (step S12).

If the NI of the MICH instructs an update of the MCCH information with respect to the first MBMS, the terminal receives the SCCPCH#0, to which the MCCH is mapped, starting from the next MCCH modification period, preferably, a second modification period (step S13). Here, if the MCCH information includes RB configuration information with respect to the first MBMS, the terminal establishes an RB with respect to the first MBMS using the RB configuration information.

The RB configuration information comprises a PDCP, an RLC, physical layer information, logical channel MTCH#1 information, information of the transport channel FACH to which the MTCH#1 is mapped, and information of the physical channel SCCPCH#1 to which the FACH is mapped. Thus, in order to receive data of the first MBMS, the terminal sets each channel with each layer by using the RB configuration information. The terminal receives the data of the first MBMS through the established RB (step S14).

Even if the RNC determines to update the MCCH information and informs the terminal about the update of the MCCH information through the NI of the MICH, the terminal receiving the SCCPCH#1 cannot receive the MICH because of performance limitations. Namely, the terminal cannot receive the indicator NI, which informs the terminal that the MCCH information of the second MBMS has been updated via the MICH (step S15).

Thus, the terminal receiving the SCCPCH#1 receives the SNI transmitted via the SCCPCH#1 and determines whether the SNI indicates the first MBMS or the second MBMS the terminal has subscribed to (step S16). If the received SNI instructs updating the MCCH information with respect to the second MBMS service, the terminal may receive the SCCPCH#0, to which the MCCH is mapped, starting from the next MCCH modification period, preferably, a fifth modification period. Accordingly, the terminal may receive the update MCCH information with respect to the second MBMS from the SCCPCH#0 (step S17).

However, as shown in FIG. 6, because the terminal currently receives the SCCPCH#1, it may continuously receive the SCCPCH#1. The terminal may receive scheduling information via the SCCPCH#1 (step S18). The scheduling information is used to inform whether data of the first MBMS is to be transmitted during a specific interval. In accordance with a preferred embodiment of the present invention, the terminal preferably receives scheduling information indicating that a data transmission of the first MBMS is suspended during a specific interval. Accordingly, the terminal suspends the reception of the SCCPCH#1 according to the scheduling information.

In case that the terminal, which has established the RB for the first MBMS, suspends the reception of the SCCPCH#1, to which the MTCH#1 is mapped, for more than a predetermined time due to discontinuous transmission of the service data, the terminal receives the MICH discontinuously or periodically (step S19). The predetermined time corresponds to a length of one or more modification periods. The length of the predetermined time is either received from the UTRAN or is determined within the terminal.

While the terminal does not receive MBMS data because of the suspended reception of the SCCPCH#1, it cannot receive the SNI. Thus, the terminal cannot check whether MCCH information is updated or not using the SNI.

Accordingly, while the terminal does not receive the SCCPCH#1 temporarily, it receives the MICH periodically to obtain the NI and determines whether the NI indicates the first or the second MBMS (step S20). If the received NI instructs the update of the MCCH information with respect to the first MBMS, the terminal receives the SCCPCH#0, to which MCCH is mapped. The terminal receives the SCCPCH#0 starting from the next MCCH modification period, preferably, an eighth modification period. Accordingly, the terminal may receive updated MCCH information with respect to the first MBMS from the SCCPCH#0. In this respect, if the MCCH information includes RB reconfiguration information with respect to the first MBMS, the terminal reconfigures the RB with respect to the first MBMS using the RB reconfiguration information.

The terminal resumes receiving the data of the first MBMS according to the scheduling information (step S22). Because the terminal receiving the SCCPCH#1 cannot receive the MICH due to performance limitations, it cannot receive an indicator informing the terminal that the MCCH information of the third MBMS has been updated via the MICH (step S23).

Thus, the terminal receiving the SCCPCH#1, receives the SNI transmitted via the SCCPCH#1 and determines whether the SNI indicates the first or the second MBMS the terminal has subscribed to (step S24). If the SNI indicates an update of the MCCH information with respect to the third MBMS that the terminal has not subscribed to, the terminal disregards the SNI and does not receive the SCCPCH#0, to which the MCCH is mapped. Accordingly, the terminal continues to receive the SCCPCH#1 (step S25).

The terminal discontinuously receives the SCCPCH#1 using the scheduling information the UTRAN transmits. Here, if the SCCPCH#1, to which the MTCH#1 is mapped, is to be received for less than a predetermined time, the terminal does not receive the MICH even while it does not receive the SCCPCH#1.

When the terminal suspends reception of the SCCPCH#1, to which the MTCH#1 is mapped, for more than a predetermined time, it receives the MICH periodically. The MICH having the NI must necessarily be transmitted to the terminal because if MBMS data is not transmitted to the terminal, the terminal cannot receive the SNI. Accordingly, the terminal would not be able to check whether or not the MCCH information has been updated. Therefore, transmitting the MICH allows the terminal to check for the update of the MCCH information when MBMS data is not transmitted. However, if the terminal suspends reception of the SCCPCH#1 for less than the predetermined time, the terminal does not receive the MICH and keeps receiving the SCCPCH#1 discontinuously.

Figure 7:
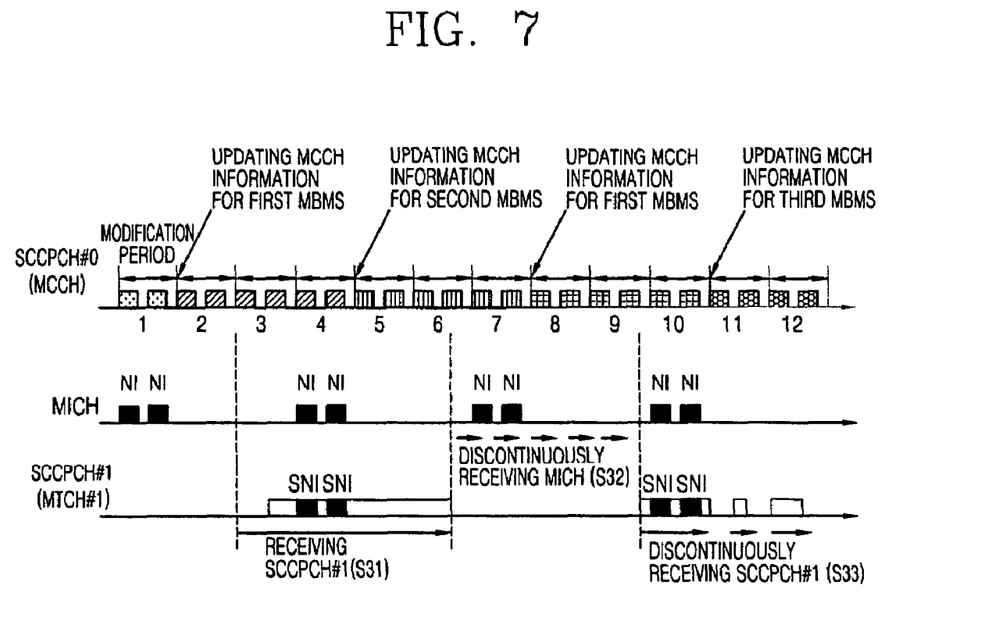
FIG. 7 illustrates a method for receiving channels of a terminal of FIG. 6, in accordance with a preferred embodiment of the present invention.

FIG. 7 illustrates a method for receiving channels of the terminal of FIG. 6. After establishing an RB, the terminal receives the SCCPCH#1 (step S31). The terminal suspends reception of the SCCPCH#1 during a specific interval according to the scheduling information received from the UTRAN. Preferably, the specific interval is more than a predetermined time and the terminal continuously or periodically receives the MICH (step S32).

The terminal resumes reception of the SCCPCH#1 from a point indicated by the scheduling information (step S33). When data of the first MBMS is discontinuously transmitted, the terminal receives the SCCPCH#1 discontinuously according to the scheduling information received from the UTRAN. In this case, if the specific interval is less than the predetermined time, the terminal does not receive the MICH.

Figure 8:
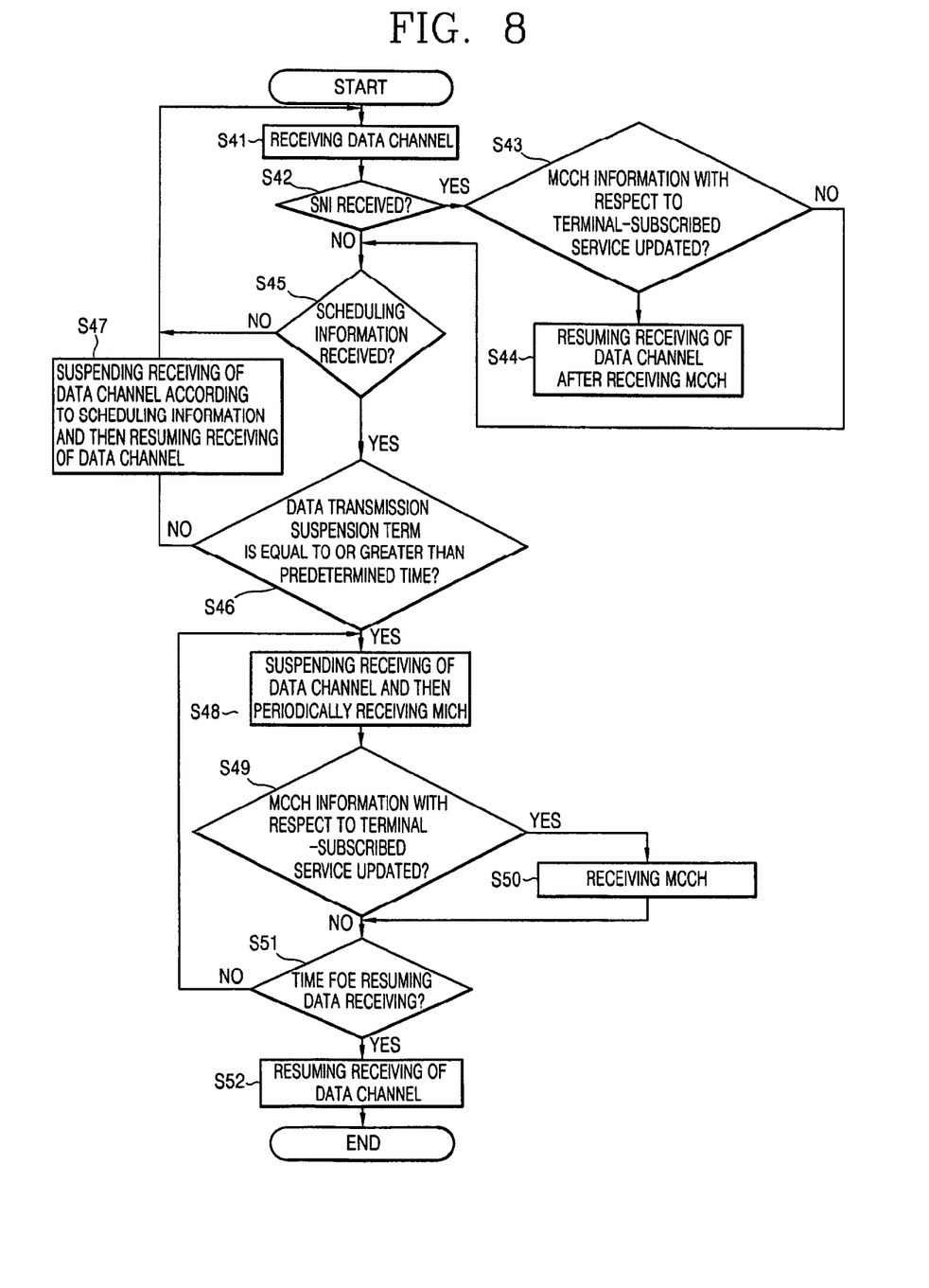
FIG. 8 is a flow chart illustrating an operation of the terminal for receiving a point-to-multipoint service, in accordance with a preferred embodiment of the present invention.

FIG. 8 is a flow chart illustrating an operation of the terminal for receiving a specific MBMS in accordance with a preferred embodiment of the present invention. As shown in FIG. 8, the terminal establishes an RB with respect to the specific MBMS and then receives a data channel through which data of the MBMS is transmitted. Preferably, the terminal receives a physical channel SCCPCH to which an MTCH is mapped (step S41).

The terminal checks whether an SNI has been received from the data channel (step S42). If the SNI has been received, the terminal checks whether the SNI indicates an update of MCCH information with respect to the service the terminal has subscribed to (step S43). If the SNI indicates the update of the MCCH information with respect to the terminal-subscribed service, the terminal receives the MCCH to obtain the MCCH information and then resumes the reception of the data channel (step S44).

While the data channel is being received, the terminal checks whether scheduling information is also received along with the data channel (step S45). When the scheduling information is received, the terminal compares a data transmission suspension time included in the scheduling information and a predetermined time stored in the terminal (step S46). If the data transmission suspension time is not greater than the predetermined time stored in the terminal, the terminal suspends the reception of the data channel according to the scheduling information and resumes the reception of the data channel (step S47).

If, however, the data transmission suspension time is equal to or greater than the predetermined time stored in the terminal, the terminal suspends reception of the data channel according to the scheduling information and periodically receives an MICH (step S48).

The terminal then checks whether an NI received through the MICH indicates an update of MCCH information with respect to the terminal-subscribed service (step S49). If so, the terminal obtains MCCH information through an MCCH and periodically receives the MCCH (step S50).

While the terminal suspends the reception of the data channel, it continues to check whether a current time is a data transmission resume time included in the scheduling information (step S51), and periodically receives the MICH until the data transmission resume time arrives. When the data transmission resume time arrives, the terminal resumes the reception of the data channel (step S52), and continuously receives the data channel according to a message transmitted from the UTRAN until the RB is released.

As so far described, the method for notifying updated control information in a wireless communication system in accordance with the present invention has many advantages. For example, an indication about whether MCCH information has been updated is transmitted and received during a time interval where data of an MBMS is not transmitted between a wireless system and a terminal. Furthermore, an indication about whether the MCCH information has been updated is transmitted and received via an SCCPCH that is mapped to an MTCH so that the terminal, which receives data of a specific MBMS discontinuously, may effectively recognize whether the MCCH information has been updated.

In addition, while the data of the MBMS is not transmitted for more than a predetermined time, an indication about whether the MCCH information has been updated is transmitted through the NI of the MICH, and not through the SNI. Thus, power consumption for receiving the SCCPCH, to which the MTCH is mapped, can be reduced. Accordingly, a terminal battery can be more effectively used.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to a certain type of wireless communication system. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The foregoing embodiments and advantages are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for receiving a point-to-multipoint service in a wireless communication system, the method comprising:
   discontinuously receiving a first channel for receiving the point-to-multipoint service;
   receiving first notification information for receiving a control information message during an ongoing session of the point-to-multipoint service when a mobile terminal receives the first channel;
   receiving a second channel for receiving second notification information when the mobile terminal does not receive the first channel while maintaining the ongoing session of the point-to-multipoint service;
   determining to receive a control channel for receiving the control information message according to the second notification information; and
   receiving the control information message if the mobile terminal determines to receive the control channel,
   wherein the first channel is an Multimedia Broadcast Multicast Service (MBMS) traffic channel (MTCH), the second channel is an Multimedia Broadcast Multicast Service (MBMS) indicator channel (MICH) and the control channel is an Multimedia Broadcast Multicast Service (MBMS) control channel (MCCH).

2. The method of claim 1, further comprising configuring the first channel for receiving the point-to-multipoint service during an ongoing session of the point-to-multipoint service.

3. The method of claim 2, wherein when the mobile terminal does not receive the first channel during the ongoing session, the mobile terminal maintains the configuration of the first channel.

4. The method of claim 1, wherein the step of determining to receive the control channel comprises determining whether the second notification information indicates that a mobile terminal subscribing to the point-to-multipoint service should receive the control information message.

5. The method of claim 1, wherein the second notification information is periodically received during a time interval when the first channel is not received.

6. The method of claim 1, wherein the control information message is periodically received.

7. The method of claim 1, further comprising suspending reception of the first channel according to scheduling information received by the mobile terminal.

8. The method of claim 7, wherein the scheduling information indicates a time interval for suspending reception of the first channel.

9. The method of claim 8, further comprising resuming reception of the first channel when the time interval for suspending reception has ended.

10. The method of claim 1, further comprising resuming reception of the first channel after the control information message is received.

11. The method of claim 1, wherein the first notification information is a secondary notification indicator (SNI) and the second notification information is a notification indicator (NI).

12. A method for transmitting a point-to-multipoint service in a wireless communication system, the method comprising:
    discontinuously transmitting a first channel for transmitting the point-to-multipoint service;
    transmitting first notification information for transmitting a control information message during an ongoing session of the point-to-multipoint service when a mobile terminal receives the first channel;
    transmitting a second channel for transmitting second notification information when the mobile terminal does not receive the first channel while maintaining the ongoing session of the point-to-multipoint service;
    transmitting a control channel for transmitting the control information message according to the second notification information; and
    transmitting the control information message if the mobile terminal determines to receive the control channel,
    wherein the first channel is an Multimedia Broadcast Multicast Service (MBMS) traffic channel (MTCH), the second channel is an Multimedia Broadcast Multicast Service (MBMS) indicator channel (MICH) and the control channel is an Multimedia Broadcast Multicast Service (MBMS) control channel (MCCH).

13. The method of claim 12, wherein the mobile terminal configures the first channel for receiving the point-to-multipoint service during an ongoing session of the point-to-multipoint service.

14. The method of claim 13, wherein when the mobile terminal does not receive the first channel during the ongoing session, the mobile terminal maintains the configuration of the first channel.

15. The method of claim 12, wherein the mobile terminal determines to receive the control channel by determining whether the second notification information indicates that a mobile terminal subscribing to the point-to-multipoint service should receive the control information message.

16. The method of claim 12, wherein the second notification information is periodically transmitted during a time interval when the first channel is not transmitted.

17. The method of claim 12, wherein the control information message is periodically transmitted.

18. The method of claim 12, further comprising suspending transmission of the first channel according to scheduling information transmitted to the mobile terminal.

19. The method of claim 18, wherein the scheduling information indicates a time interval for suspending transmission of the first channel.

20. The method of claim 18, further comprising resuming transmission of the first channel when the time interval for suspending transmission has ended.

21. The method of claim 12, further comprising resuming transmission of the first channel after the control information message is received by the mobile terminal.

22. The method of claim 12, wherein the first notification information is a secondary notification indicator (SNI) and the second notification information is a notification indicator (NI).

23. A mobile terminal for receiving a point-to-multipoint service in a wireless communication system, the mobile terminal comprising:
- means for discontinuously receiving a first channel for receiving the point-to-multipoint service;
- means for receiving first notification information for receiving a control information message during an ongoing session of the point-to-multipoint service when the mobile terminal receives the first channel;
- means for receiving a second channel for receiving second notification information when the mobile terminal does not receive the first channel while maintaining the ongoing session of the point-to-multipoint service;
- means for determining to receive a control channel for receiving the control information message according to the second notification information; and
- means for receiving the control information message if the mobile terminal determines to receive the control channel,
- wherein the first channel is an Multimedia Broadcast Multicast Service (MBMS) traffic channel (MTCH), the second channel is an Multimedia Broadcast Multicast Service (MBMS) indicator channel (MICH) and the control channel is an Multimedia Broadcast Multicast Service (MBMS) control channel (MCCH).

24. The mobile terminal of claim 23, further comprising means for configuring the first channel for receiving the point-to-multipoint service during an ongoing session of the point-to-multipoint service.

25. The mobile terminal of claim 24, wherein when the mobile terminal does not receive the first channel during the ongoing session, the mobile terminal maintains the configuration of the first channel.

26. The mobile terminal of claim 23, wherein the means for determining to receive the control channel comprises means for determining whether the second notification information indicates that a mobile terminal subscribing to the point-to-multipoint service should receive the control information message.

27. The mobile terminal of claim 23, wherein the second notification information is periodically received during a time interval when the first channel is not received.

28. The mobile terminal of claim 23, wherein the control information message is periodically received.

29. The mobile terminal of claim 23, further comprising means for suspending reception of the first channel according to scheduling information received by the mobile terminal.

30. The mobile terminal of claim 29, wherein the scheduling information indicates a time interval for suspending reception of the first channel.

31. The mobile terminal of claim 30, further comprising means for resuming reception of the first channel when the time interval for suspending reception has ended.

32. The mobile terminal of claim 23, further comprising means for resuming reception of the first channel after the control information message is received.

33. The mobile terminal of claim 23, wherein the first notification information is a secondary notification indicator (SNI) and the second notification information is a notification indicator (NI).

* * * * *